(12) United States Patent
Vandermolen et al.

(10) Patent No.: US 12,429,958 B2
(45) Date of Patent: Sep. 30, 2025

(54) REUSABLE NOTEBOOK AND METHODS THEREOF

(71) Applicant: SOCIÉTÉ BIC, Clichy (FR)

(72) Inventors: Mathieu Vandermolen, Clichy (FR); Karim Salam, Clichy (FR)

(73) Assignee: SOCIÉTÉ BIC, Clichy (FR)

( * ) Notice: Subject to any disclaimer, the term of this patent is extended or adjusted under 35 U.S.C. 154(b) by 24 days.

(21) Appl. No.: 17/801,675

(22) PCT Filed: Mar. 5, 2021

(86) PCT No.: PCT/EP2021/055659
§ 371 (c)(1),
(2) Date: Aug. 23, 2022

(87) PCT Pub. No.: WO2021/180593
PCT Pub. Date: Sep. 16, 2021

(65) Prior Publication Data
US 2023/0125465 A1    Apr. 27, 2023

(30) Foreign Application Priority Data
Mar. 9, 2020    (EP) .................... 20315036

(51) Int. Cl.
*G06F 3/03*    (2006.01)
*B42D 1/00*    (2006.01)
(Continued)

(52) U.S. Cl.
CPC ........... *G06F 3/0321* (2013.01); *B42D 1/007* (2013.01); *B42D 1/008* (2013.01); *B43K 29/003* (2013.01);
(Continued)

(58) Field of Classification Search
CPC .... G06F 3/0321; G06F 3/03545; G06F 3/038; G06F 3/16; G06V 30/1426; B42D 1/007; B42D 1/008; B43K 29/003; B43K 29/08
See application file for complete search history.

(56) References Cited

U.S. PATENT DOCUMENTS

| 5,852,434 A | 12/1998 | Sekendur |
| 6,678,499 B1 | 1/2004 | Silverbrook et al. |

(Continued)

FOREIGN PATENT DOCUMENTS

| CN | 101187839 A | 5/2008 |
| EP | 1133753 B1 | 9/2001 |

(Continued)

OTHER PUBLICATIONS

International Search Report and Written Opinion issued in International Application PCT/EP2021/055659, dated Jun. 28, 2021 (10 pages).

(Continued)

*Primary Examiner* — Mishawn N. Hunter
(74) *Attorney, Agent, or Firm* — Bookoff McAndrews, PLLC

(57) ABSTRACT

A writing system that includes a reusable notebook including a sheet having a working surface. The working surface includes a printed code and an operative control. The writing system includes a writing instrument configured to capture images of the printed code and a computing device configured to communicate with the reusable notebook and/or the writing instrument. The sheet includes a surface coating over the working surface configured so that a writing material of the writing instrument can be removed by applying a dry ancillary device.

16 Claims, 3 Drawing Sheets

(51) Int. Cl.
  *B43K 29/00* (2006.01)
  *B43K 29/08* (2006.01)
  *G06F 3/0354* (2013.01)
  *G06F 3/038* (2013.01)
  *G06F 3/16* (2006.01)
  *G06V 30/142* (2022.01)
  *B43L 19/00* (2006.01)

(52) U.S. Cl.
  CPC .......... *B43K 29/08* (2013.01); *G06F 3/03545* (2013.01); *G06F 3/038* (2013.01); *G06F 3/16* (2013.01); *G06V 30/1426* (2022.01); *B43L 19/00* (2013.01)

(56) References Cited

U.S. PATENT DOCUMENTS

| | | |
|---|---|---|
| 7,175,095 B2 | 2/2007 | Pettersson et al. |
| 7,941,338 B2 | 5/2011 | Silverbrook et al. |
| 2004/0091849 A1* | 5/2004 | Gallant .................... B43L 1/08 434/408 |
| 2004/0252030 A1 | 12/2004 | Trimble et al. |
| 2006/0031245 A1 | 2/2006 | Krieglstein |
| 2006/0154559 A1 | 7/2006 | Yoshida |
| 2008/0019616 A1 | 1/2008 | Hotta et al. |
| 2008/0231038 A1 | 9/2008 | Canasi et al. |
| 2009/0003733 A1 | 1/2009 | Osakabe et al. |
| 2009/0085745 A1 | 4/2009 | Gupta et al. |
| 2009/0148603 A1 | 6/2009 | Goscha |
| 2009/0236152 A1 | 9/2009 | Liang et al. |
| 2009/0253107 A1 | 10/2009 | Marggraff |
| 2009/0267923 A1* | 10/2009 | Van Schaack ........ G06F 3/0317 345/179 |
| 2012/0209671 A1 | 8/2012 | Toyoda et al. |
| 2013/0033429 A1 | 2/2013 | Silverbrook |
| 2014/0176512 A1 | 6/2014 | Srinivas et al. |
| 2015/0056599 A1* | 2/2015 | O'Connor ................. G09F 7/00 434/430 |
| 2015/0116283 A1 | 4/2015 | Black et al. |
| 2016/0337496 A1* | 11/2016 | Jeganathan ........... H04W 76/14 |
| 2017/0342296 A1 | 11/2017 | Markovitz, II et al. |
| 2018/0134068 A1* | 5/2018 | Lemay ................. B41M 7/0009 |
| 2018/0189472 A1 | 7/2018 | Dewan et al. |
| 2019/0153250 A1 | 5/2019 | Donbrosky, Jr. et al. |
| 2020/0074167 A1 | 3/2020 | Morwing et al. |

FOREIGN PATENT DOCUMENTS

| | | |
|---|---|---|
| JP | 2004094558 A | 3/2004 |
| JP | 2006031492 A | 2/2006 |
| JP | 2013052684 A | 3/2013 |
| WO | 2008133411 A1 | 11/2008 |
| WO | 2009/124153 A2 | 10/2009 |

OTHER PUBLICATIONS

European search report in corresponding European Application No. 20315036.2, dated Sep. 2, 2020 (7 pages).

International Search Report and Written Opinion issued in International Application PCT/EP2021/055677, dated Jun. 28, 2021 (15 pages).

* cited by examiner

REUSABLE NOTEBOOK AND METHODS THEREOF

CROSS-REFERENCE TO RELATED APPLICATIONS

This application is a National Stage Application of International Application No. PCT/PCT/EP2021/055659, filed on Mar. 5, 2021, now published as WO/2021/180593, which claims benefit from European patent application No. EP20315036.2, filed on Mar. 9, 2020, the entire contents of which are incorporated herein by reference.

FIELD

Aspects of the present disclosure relate generally to apparatuses interacting with a computing system to digitize writing, and specifically to examples of reusable notebooks including coded data printed on a sheet for use with a writing instrument having an imaging device.

BACKGROUND

Due to rising environmental concerns, prospective consumers seeking to generate handwritten materials may be interested in identifying substitutes for paper to minimize an environmental footprint associated with using paper products. Despite the high levels of consumption and waste associated with using paper, consumers continue to rely upon and prefer paper as a medium for producing handwritten materials due to an availability, simplicity, and/or familiarity of the product. Systems attempting to replace paper products, generally involve complicated methods of capturing photographic images of a written product with an ancillary device (e.g., a camera, smartphone, tablet, etc.) to store the writing prior to erasing the generated content and reutilizing the substitute medium. Providing an apparatus capable of generating handwritten materials and replicating the simplicity of writing on paper, without requiring use of a supplemental device may allow consumers to minimize an environmental impact and retain the benefits of writing on paper (e.g., availability, instantaneity, natural feel, familiarity of pen on paper, etc.) while not requiring additional devices.

BRIEF DESCRIPTION OF THE DRAWINGS

The accompanying drawings, which are incorporated in and constitute a part of this disclosure, illustrate various exemplary embodiments and together with the description, serve to explain the principles of the disclosure.

Aspects of the disclosure may be implemented in connection with embodiments illustrated in the attached drawings. These drawings show different aspects of the present disclosure and, where appropriate, reference numerals illustrating like structures, components, materials and/or elements in different figures are labeled similarly. It is understood that various combinations of the structures, components, and/or elements, other than those specifically shown, are contemplated and are within the scope of the present disclosure. There are many aspects and embodiments described herein. Those of ordinary skill in the art will readily recognize that the features of a particular aspect or embodiment may be used in conjunction with the features of any or all of the other aspects or embodiments described in this disclosure.

SUMMARY

According to an example, a writing system is provided. The writing system includes a reusable notebook including a sheet having a working surface. The working surface includes a printed code including an operative control. The writing system includes a writing instrument configured to capture images during use of the writing instrument on the working surface of the reusable notebook. The writing system includes a computing device configured to communicate with the reusable notebook and/or the writing instrument. The sheet includes a surface coating over the working surface configured so that a writing material of the writing instrument, e.g. an ink, can be removed by applying a dry ancillary device.

According to an example, a method of generating reusable content with a writing system substantially as herein disclosed is provided. The method comprises the steps of initiating the imaging device to capture one or more images during use of the writing instrument on the working surface of the reusable notebook. The method further comprises converting the one or more images into one or more electronic formats with the computing device.

DETAILED DESCRIPTION

The reusable notebook and the writing instrument of the present disclosure may be in the form of varying embodiments, some of which are depicted by the figures and further described below.

Both the foregoing general description and the following detailed description are exemplary and explanatory only and are not restrictive of the features, as claimed. As used herein, the terms "comprises," "comprising," or other variations thereof, are intended to cover a non-exclusive inclusion such that a process, method, article, or apparatus that comprises a list of elements does not include only those elements but may include other elements not expressly listed or inherent to such a process, method, article, or apparatus. Additionally, the term "exemplary" is used herein in the sense of "example," rather than "ideal." It should be noted that all numeric values disclosed or claimed herein (including all disclosed values, limits, and ranges) may have a variation of +/−10% (unless a different variation is specified) from the disclosed numeric value. Moreover, in the claims, values, limits, and/or ranges mean the value, limit, and/or range+/− 10%.

Reference throughout the preceding specification to "one embodiment", "an embodiment", "one example" or "an example", "one aspect" or "an aspect" means that a particular feature, structure or characteristic described in connection with the embodiment or example is included in at least one embodiment of the present disclosure. Thus, appearances of the phrases "in one embodiment", "in an embodiment", "one example" or "an example", "one aspect" or "an aspect" in various places throughout this specification are not necessarily all referring to the same embodiment or example.

Figure 1:
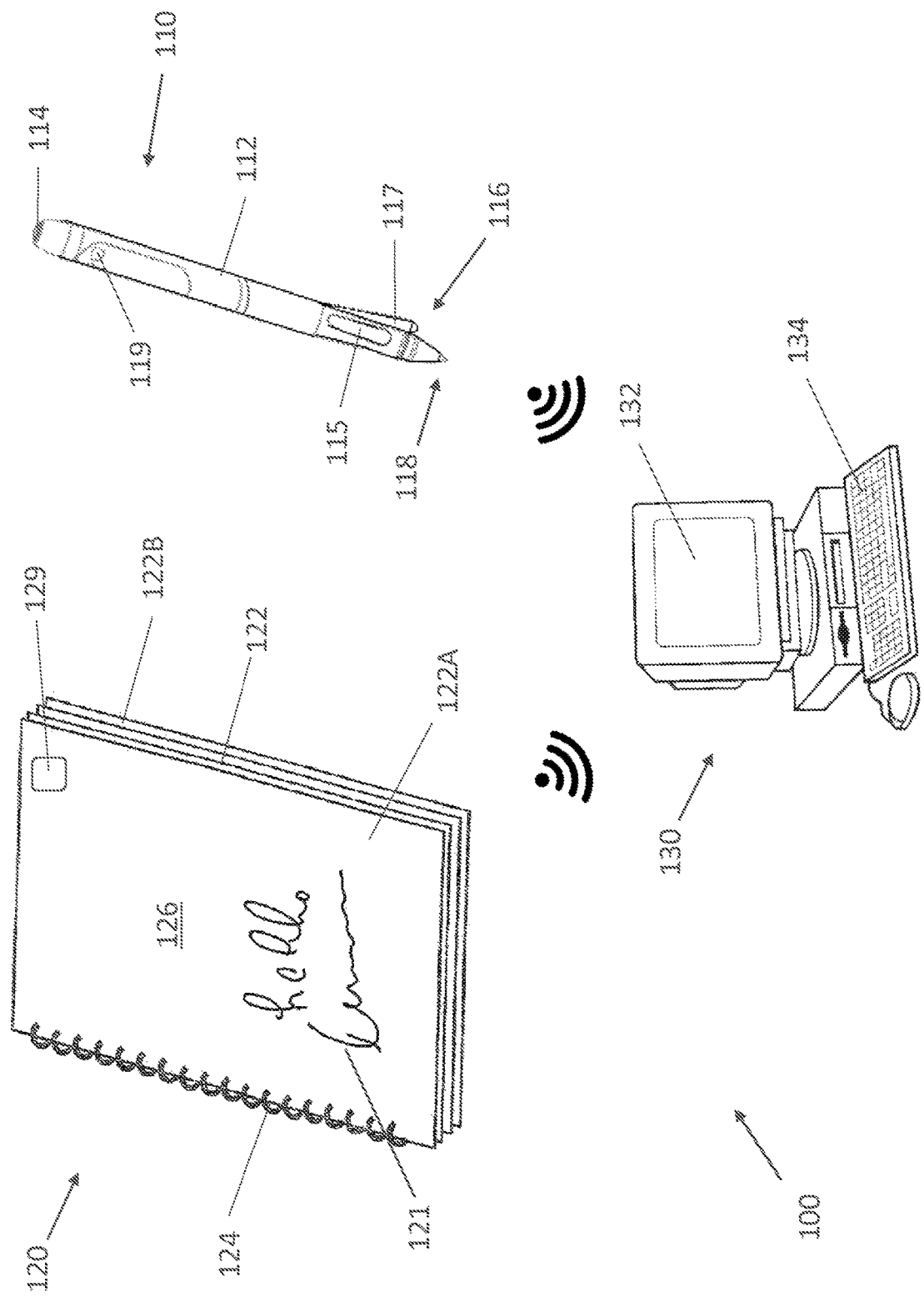
FIG. 1 is a perspective view of a writing system including a reusable notebook, a writing instrument, and a computing device.

FIG. 1 shows an exemplary writing system 100 that may include writing instrument 110, reusable notebook 120, and a computing device 130. Writing instrument 110 may include body 112 having a longitudinal length defined between proximal end 114 and distal end 116 and may further include one or more grip features 115 disposed along body 112. In examples, the one or more grip feature 115 may be located adjacent to distal end 116. In examples, the writing instrument 110 may include additional and/or fewer grip features 115 positioned along various other portions of body 112.

Writing instrument 110 may further include tip 118 at distal end 116 that may be configured to mark e.g., dispense a material such as ink, one or more other components of writing system 100, such as, for example, reusable notebook 120. In examples, the writing instrument 110 may include one or more cavities disposed within body 112 for storing the material such as ink, and the cavities may be fluidly coupled to tip 118. In embodiments, writing instrument 110 may include a pen, a pencil, a marker, a brush, a highlighter, a stylus, a quill, a multifunction pen, etc. As described in further detail herein, writing instrument 110 may be configured to communicatively interact with reusable notebook 120 while dispensing the material thereon.

Still referring to FIG. 1, writing instrument 110 may include imaging device 117 positioned along body 112. In examples, imaging device 117 may be located proximate to distal end 116 and adjacent to grip features 115. In examples, imaging device 117 may be arranged within the body 112. Imaging device 117 may be an optical system e.g., a sensor, a camera, etc. facing distally toward tip 118. In examples, the imaging device 117 may be configured to capture photographic images of a working surface 126 of the reusable notebook 120, positioned adjacent to tip 118 during use of writing instrument 110. In embodiments, writing instrument 110 may also include a light source (not shown) e.g. positioned along body 112 and located proximate to distal end 116. The light source may also face distally toward tip 118 thereby being configured to illuminate the working surface 126 of the reusable notebook 120 that in use of the writing instrument 110 is adjacent to tip 118. In this instance, the light source may be operable to facilitate capturing images with the imaging device 117 by illuminating the working surface 126 of the reusable notebook 120 to be imaged. In embodiments, writing instrument 110 may include a conventional writing apparatus e.g., an off-the-shelf pen or pencil that is provided with "smart" capabilities e.g., image capture capabilities, for example, by securely fastening a separate device e.g., imaging device 117, a light source, a microphone, etc. via a suitable fastening mechanism e.g., an adhesive, a binding, a ring, a wire, etc.

Furthermore, writing instrument 110 may include one or more actuators 119 positioned on the body 112 and located adjacent to the proximal end 114. The one or more actuators 119 e.g., buttons, switches, knobs, etc. may be configured to control the imaging device 117 of the writing instrument 110. The actuators 119 may further be configured to control the light source of writing instrument 110 and/or a friction member if present e.g. within the barrel, the tip or a clip of the writing instrument. In examples, the writing instrument 110 may include other hardware components disposed within the body 112, such as, for example, a microphone for recording audio, a memory configured to store data e.g., image data produced by the imaging device 117 or audible data recorded by a microphone, etc. and/or a communications module e.g., a wireless controller configured to communicate with the reusable notebook 120 and/or the computing device 130. In examples, the communications module may be configured to utilize Bluetooth® technology, a Wi-Fi network, NFC and/or radio waves frequencies e.g., via an antenna.

Still referring to FIG. 1, reusable notebook 120 may include one or more sheets 122 coupled to one another by fastening mechanism 124. Throughout the present description and claims a sheet should be understood as a synthetic plastic paper type able to perform as paper but that is tear-resistant and withstands weather conditions or water. Examples of typical sheet substrates may be made of a polyester such as a high-density polyethylene (HDPE) film, PVC, paper-film. In aspects, the sheet includes a surface coating over the working surface configured so that a material of the writing instrument e.g. an ink, can be removed by applying a dry ancillary device. In the depicted embodiment, reusable notebook 120 includes four of sheets 122 and the fastening mechanism 124 includes a coil binding extending through each of the plurality of sheets 122. In examples, other number of sheets may be foreseen. In examples, the reusable notebook 120 may include various other suitable fastening mechanisms e.g., an adhesive, a coil, a ring, a staple, a zip bind, a wire, a magnet etc. for securing sheets 122. In embodiments, the fastening mechanism 124 may be omitted entirely from the reusable notebook 120 such that the sheets 122 may be selectively removable from the reusable notebook 120.

Throughout the present description and claims, a sheet including a surface coating on its working surface configured so that a writing material such as ink can be removed by applying a dry device should be understood as a glossy or smooth surface coating. More specifically, the working surface may be glossy or smooth, more specifically non-porous. In other words, the surface coating or the sheet having a working surface is configured such that an ink or any other type of writing material cannot penetrate it.

In the depicted example, each of the plurality of sheets 122 may define at least one working surface 126. In embodiments, the sheets 122 may include a pair of working surfaces 126 on opposing sides of each sheet 122. In examples, other number of working surfaces may also be foreseen. In examples, the reusable notebook 120 may further include one or more outer covers bound to the plurality of sheets 122 by the same fastening mechanism 124 or by any additional fastening mechanism. For example, the reusable notebook 120 may include a front cover (not shown) positioned relatively over a first sheet 122A and/or a rear cover (not shown) positioned relatively below a last sheet 122B. In this instance, the plurality of sheets 122 may be disposed between the outer covers of reusable notebook 120. In embodiments, one or more aspects of reusable notebook 120 may be provided to other suitable writing surfaces, including, but not limited to, a tablet, a whiteboard, a chalkboard, a legal pad, a calendar, an index/note card, a sticky note, a digital slate, an E-writer, and the like.

Still referring to FIG. 1, each of the plurality of sheets 122 may include one or more indicia disposed on the working surface 126, such as, for example, a line, a marking, a label, and/or the like.

The one or more sheets 122 include a surface coating over the working surface 126 configured so that an ink or any other writing material of the writing instrument (110) can be removed by applying a dry ancillary device. The surface coating can be configured to provide a low porosity protective layer over the working surface 126. In examples, the surface coating may include, but is not limited to, a specific coating for HP Indigo as the synthetic paper commercially available by Arjobex as Polyart®. Alternative coated synthetic paper sheet may be commercially available as Appvion Appleton Digital™ Parax™ stone paper, RockStock™ stone paper, Nekoosa™ XM, Nekoosa™ OM, HopSyn DL Grade®, Yupo® FPG 80, and other suitable coating materials. As a result of such coatings, written markings 121 produced on sheets 122 by writing instrument 110 may be removable by applying a dry ancillary device e.g., a dry wipe or a dry eraser against the working surface 126. Consequently, written markings produced on the sheets 122 by writing instrument 110 are removable by applying a dry ancillary device e.g., a dry wipe or dry eraser against the working surface 126. In examples with multiple working surfaces each of multiple working surfaces may be equipped with a surface coating as described herein, i.e. configured so that an ink or any other writing material of the writing instrument can be removed by applying a dry ancillary device. In examples, the surface coating on the sheets 122 may include, but is not limited to, one or more layers of a water-based film including $L^{TN}I$ finis, UV 9296, UV 9613, and/or other suitable coating materials. Such coatings may leave the sheet 122 with a satin or glossy finish. In examples, the surface coating can have a glossy or smooth finish. In some examples, a surface roughness of the surface coating e.g., an arithmetic average roughness, Ra is less than about 2 e.g., Ra less than 2 or less than about 0.5 (e.g., Ra less than 0.5).

Reusable notebook 120 may be communicatively coupled to other components of writing system 100 by, for example, a wireless connection, a wired connection, and the like. In one example, reusable notebook 120 may include a communications module e.g., a wireless controller. The communications module may include electrical circuitry (not shown) for communicating with the writing instrument 110 and/or the computing device 130. In examples, the communications module may utilize Bluetooth® technology, NFC technology, a Wi-Fi network, and/or radio waves frequencies e.g., via an antenna. Working surface 126 may be an interface of the communications module such as the wireless controller and may include a circuit area of one or more printed electronics or printed code to facilitate communication with writing instrument 110 and/or computing device 130.

Still referring to FIG. 1, at least one of the printed electronics or printed code may include an operative control 129 positioned on at least one or each of the plurality of sheets 122. Operative control 129 may be positioned on the working surface 126 at various suitable locations relative to sheet 122. In the illustrated example, sheet 122 includes at least one operative control 129 at a top-right corner of working surface 126. In examples, the working surface 126 may include additional and/or fewer operative controls 129 at various other suitable locations than those shown and described herein without departing from a scope of this disclosure. For example, operative control 129 may be located at a bottom-right corner of working surface 126 such that a user of the writing system 100 may arrive at the operative control 129 upon reaching an end of the sheet 122. In examples, the sheet 122 may include a plurality of operative controls 129 positioned along a right-side of working surface 126, such as at a conclusion of one or more lines included on the sheet 122. In examples, an operative control may be present at the conclusion of each line included on the sheet.

Operative control 129 may be selectively actuatable by a user of writing system 100 via one or more methods of interacting with operative control 129. For example, operative control 129 may be actuated in response to detecting contact of tip 118 and/or a finger of a user against operative control 129, detecting a marking on operative control 129 by imaging device 117, and the like. In embodiments, the operative control 129 may include a magnet and writing instrument 110 may include a magnetic sensor e.g., at proximal end 114, configured to detect the magnet upon alignment of the writing instrument 110 with the reusable notebook 120, e.g when the magnetic sensor is arranged at the proximal end of the writing instrument 110, the magnet would be detected when the proximal end 114 is aligned with the operative control 129 or at least one of the operative controls in circumstances. In embodiments, operative control 129 may include a code and/or tag e.g., RFID identifier and writing instrument 110 may include a receiver e.g., RFID reader configured to read the code upon alignment of writing instrument 110 with operative control 129.

Operative control 129 may be configured to perform one or more functions upon alignment, such as, for example, transmitting a signal from reusable notebook 120 to writing instrument 110. In examples, the signal transmitted from reusable notebook 120 may be indicative of a command to deliver image data recorded by the imaging device 117 to the computing device 130. As described in further detail herein, the writing instrument 110 may be configured to record informational data stored along the working surface 126 of one or more of the plurality of sheets 122 via the imaging device 117.

Still referring to FIG. 1, reusable notebook 120 may include a power source e.g., a battery configured for wireless charging, solar charging, inductive charging, and/or the like. In embodiments, the power source may be positioned adjacent to a circuit area of the working surface 126. In embodiments, the reusable notebook 120 may include a port e.g., USB or mini USB plug, Lightning, or any other suitable plug/connection port for coupling the reusable notebook 120 to one or more devices, such as, for example, the computing device 130, a power supply, and/or the like.

Computing device 130 may include a computer system incorporating a one or more hardware components that allow the computing device 130 to receive data e.g., image data, process information e.g., coded data, and/or store data. Illustrative hardware components of computing device 130 may include display 132 and user interface 134. Display 132 may be configured to generate a visual representation of the data received from writing instrument 110 and/or digital notebook 120. In examples, computing device 130 may be configured to provide a real-time video display of a written marking produced on the reusable notebook 120 by the writing instrument 110 via display 132. In examples, the computing device 130 may be configured to permit manipulations e.g., additions to, deletions from, or other edits of the written markings depicted on the display 132. User interface 134 may be configured to receive one or more user inputs at computing device 130. In embodiments, computing device 130 may include one or more of a remote station, a server, a cloud storage, an E-writer, etc. In the illustrated embodiment, computing device 130 includes a separate component from the other components of writing system 100. In embodiments, one or more aspects of computing device 130 may be included within writing instrument 110 and/or reusable notebook 120.

Figure 2:
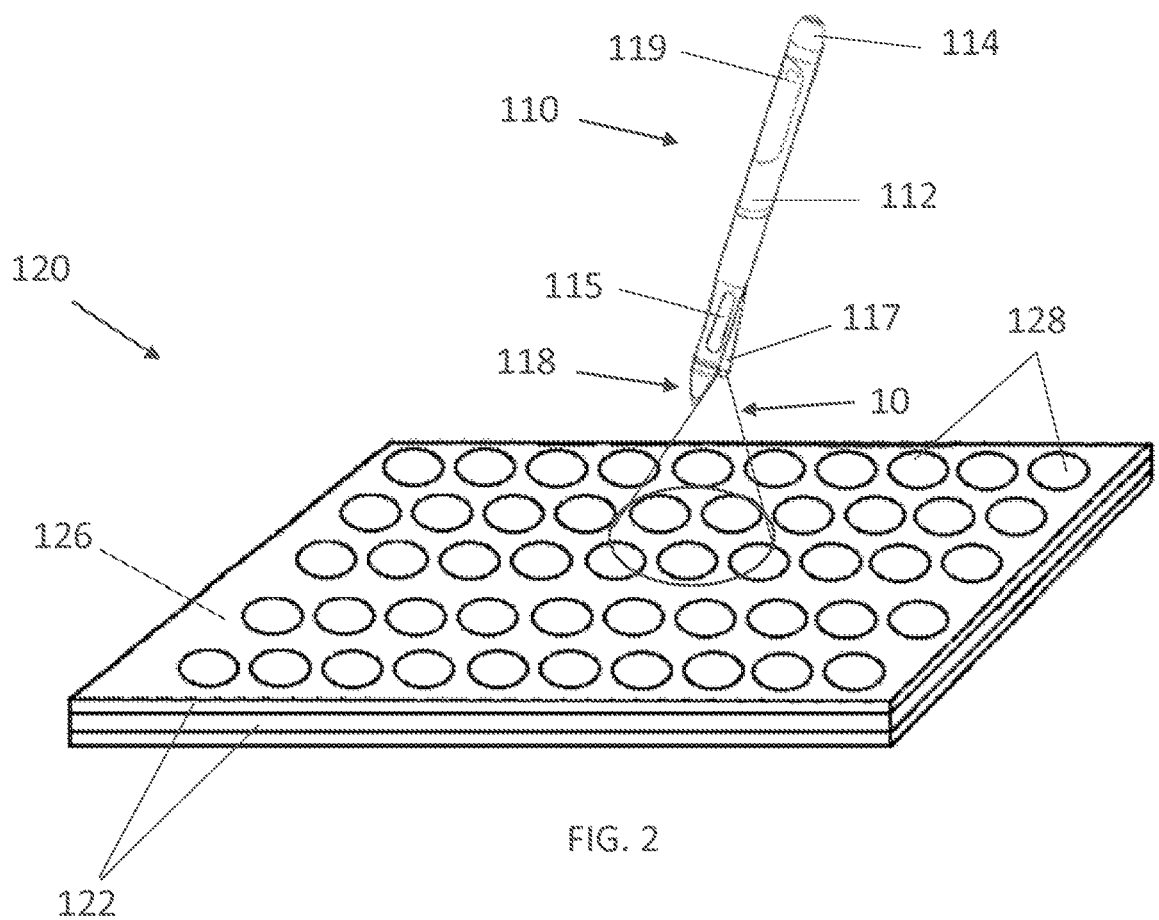
FIG. 2 is a perspective view of an interface of the reusable notebook and the writing instrument shown in FIG. 1.
Figure 3:
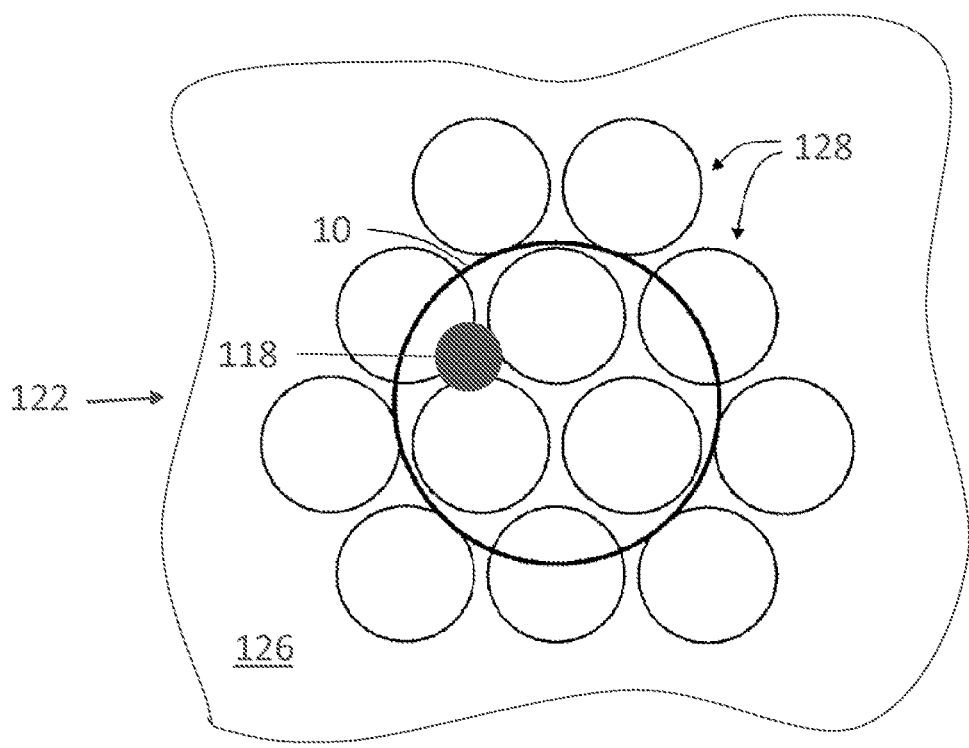
FIG. 3 is a schematic view of the writing instrument interacting with the interface of the reusable notebook shown in FIG. 2.

Referring now to FIGS. 2-3, sheet 122 is depicted with a plurality of cells 128 included on working surface 126. In examples, one or more of the plurality of cells 128 may include a segment code printed therein defining a printed code. In examples, each cell may contain a segment code printed therein. The segment code may include coded data indicative of one or more characteristics and/or properties of the sheet 122. In examples, the segment code may include a unique identifier of the particular sheet 122, i.e., identifying, for example, that the cell 128 including the segment code is located on the particular sheet relative to the plurality of sheets 122 in reusable notebook 120. In examples, the segment code may include unique directional information of the particular cell 128 relative to the plurality of cells 128 on sheet 122. Thus, the segment code stored in each of the plurality of cells 128 may correspond to positional information indicative of a particular location of cell 128 along working surface 126 and a particular sheet 122 within reusable notebook 120. In embodiments, the segment code may be preprinted on sheets 122, such as, for example, during a manufacturing of reusable notebook 120. In embodiments, a user of writing system 100 may print the segment code on one or more sheets 122 via a personal-home printer, thereby forming sheets 122 according to the aspects disclosed herein. Combinations thereof may also be foreseen, i.e. that a user may print additional segment codes on a sheet having already preprinted segment codes.

It should be understood that a size, shape, and/or quantity of cells 128 shown and described herein is merely an illustrative example such that working surface 126 may include various other sizes, shapes, configurations, quantities, and/or positions of cells 128 on sheet 122. It should be further understood that the plurality of cells 128 is depicted for illustrative and/or reference purposes only such that cells 128 may not be visible along sheet 122 to a user of writing system 100. In embodiments, the segment code printed in a cell 128 may be in the form of reading dot codes that correspond to coded data. The reading dot codes printed in a cell 128 may be detected by the imaging device 117 and analyzed to determine a location of writing instrument 110 relative to the reusable notebook, particularly to the working surface 126, upon decoding the positional information from the reading dot codes. In embodiments, the segment code printed in a cell 128 may include various other suitable forms than the reading dot codes shown and described herein.

As described in further detail below, the writing instrument 110 may be configured to detect the segment code positioned within a field of view 10 of the imaging device 117 as the distal end 116 of the writing instrument 110 is positioned over the working surface 126 of the notebook 120. It should be understood that the segment code printed in the cell 128 may not be visible along the sheet 122 to a user of writing system 100. In examples, the segment code may be printed with invisible ink e.g., infrared, near-infrared, etc. such that the coded data on the working surface 126 is invisible to the human-eye of a user of writing system 100. In examples, the printed segment code may be disposed beneath an outer protective layer of a coating disposed over the working surface 126.

Figure 4:
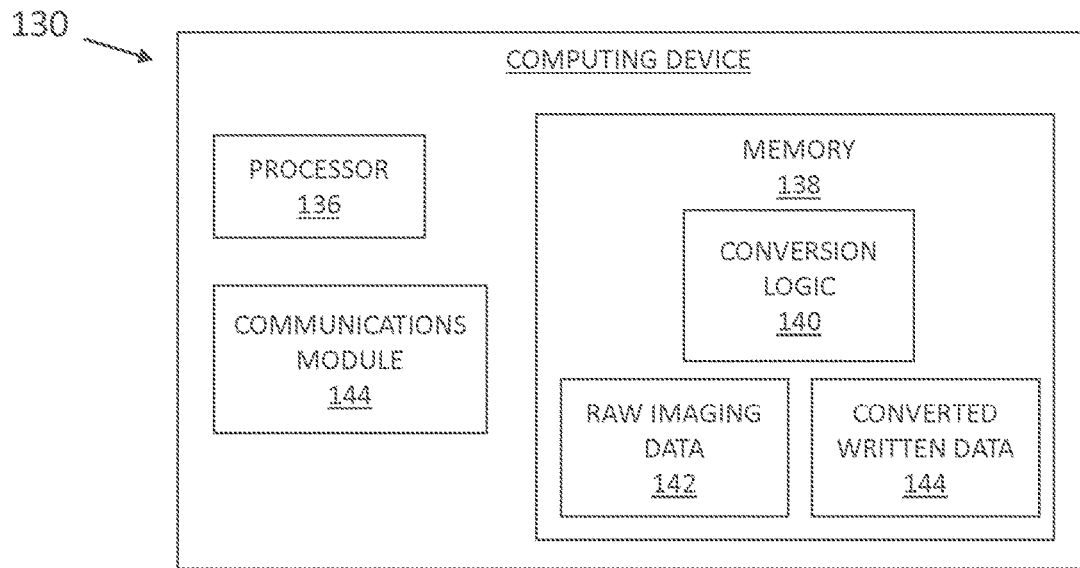
FIG. 4 is a schematic view of hardware components of the computing device shown in FIG. 1.

FIG. 4 shows additional illustrative hardware components of the computing device 130, such as, for example, at least one processor 136, at least one memory 138, and/or at least one communications module 144. In examples, the computing device 130 may include a server, a computer, a mobile user device, a tablet, smartwatch, a cloud storage, and/or the like. Although computing device 130 is shown and described herein as a separate device from the writing instrument 110 and/or the reusable notebook 120, it should be understood that, in embodiments, some or all aspects of the computing device 130 may be integrated within the writing instrument 110 and/or the reusable notebook 120. Stated differently, the illustrative hardware components of computing device 130 shown and described herein may be integral with one or more of writing instrument 110 and/or reusable notebook 120.

Processor 136 may include any computing device capable of executing machine-readable instructions, which may be stored on a non-transitory computer-readable medium, such as, for example, memory 138. In examples, processor 136 may include a controller, an integrated circuit, a microchip, a computer, and/or any other computer processing unit operable to perform calculations and logic operations required to execute a program. As described in detail herein, processor 136 is configured to perform one or more operations in accordance with the instructions stored on memory 138, such as, for example, conversion logic 140.

Still referring to FIG. 4, memory 138 may include a non-transitory computer readable medium that stores machine-readable instructions thereon, such as, for example, conversion logic 140. In examples, conversion logic 140 may include executable instructions that allow the writing system 100 to convert raw image data 142 received from writing instrument 110 e.g., via communications module 144 into converted written data 144 having one or more informational formats. In examples, converted written data 144 may include a handwritten graphical format, a digitized character format, and more. As described in greater detail herein, conversion logic 140 may further facilitate storing converted written data 144 for review by a user of writing system 100 via display 132.

It should be understood that various programming algorithms and data that support an operation of writing system 100 may reside in whole or in part in memory 138. Memory 138 may include any type of computer readable medium suitable for storing data and algorithms, such as, for example, random access memory (RAM), read only memory (ROM), a flash memory, a hard drive, and/or any device capable of storing machine-readable instructions. Memory 138 may include one or more data sets, including, but not limited to, raw image data 142 captured from imaging device 117, converted written data 144 generated by processor 136, and the like.

Figure 5:
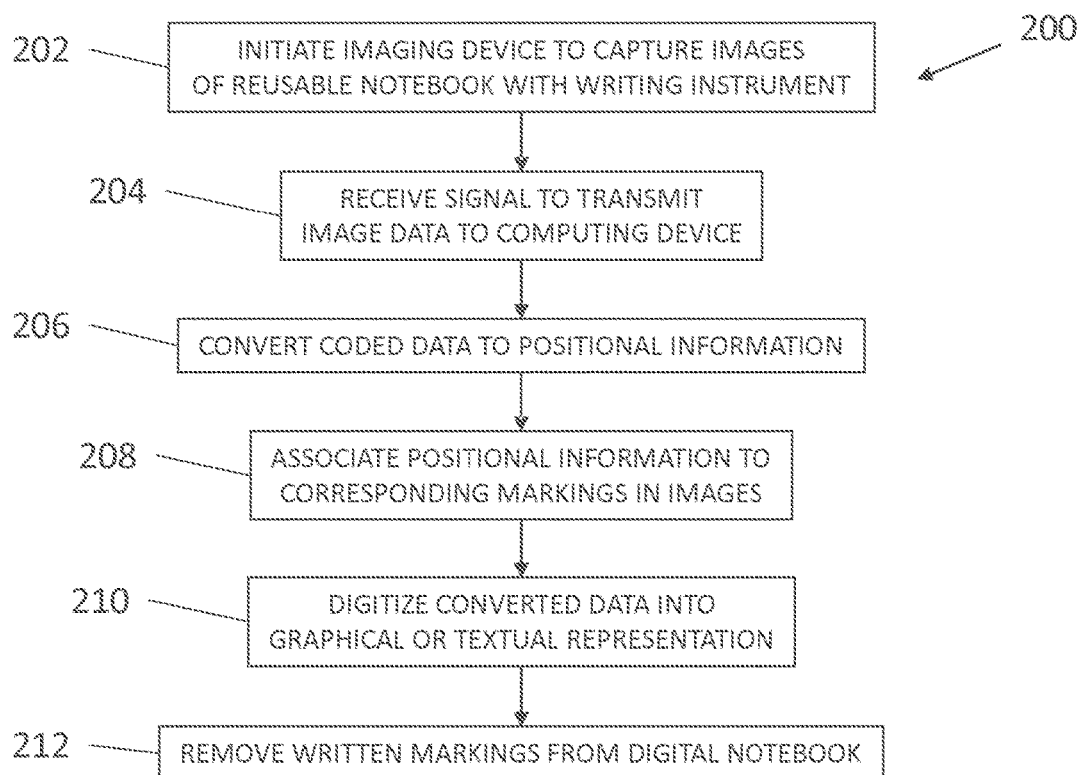
FIG. 5 is a flow diagram of an exemplary method of generating reusable content with the system shown in FIG. 1.

Referring now to FIG. 5, an example method 200 of using writing system 100 to record handwritten material e.g., text, drawings, etc. on reusable notebook 120 with writing instrument 110 and converting the handwritten material to one or more electronic formats with computing device 130 is depicted. It should be understood that the steps shown and described herein, and the sequence in which they are presented, are merely illustrative such that additional and/or fewer steps may be included without departing from a scope of this disclosure.

At step 202, imaging device 117 may be initiated via actuator 119. In this instance, imaging device 117 may capture one or more images during use of writing instrument 110 with reusable notebook 120. With distal end 116 positioned adjacent to sheet 122, the field of view 10 of imaging device 117 may project toward working surface 126 and may include one or more cells 128. The sheet includes a surface coating over the working surface configured so that a material of the writing instrument, e.g. an ink, can be removed by applying a dry ancillary device. Imaging device 117 may capture images of the coded data printed within those cells 128 that the field of view 10 may be aligned with as writing instrument 110 is moved relative to working surface 126.

Additionally, with tip 118 at least partially disposed within the field of view 10 of imaging device 117, imaging device 117 may be further operable to capture images of a material e.g., ink, dispensed from tip 118 and onto working surface 126. It should be appreciated that imaging device 117 may continuously capture images of working surface 126 during use of writing instrument 110 with reusable notebook 120 until deactivating imaging device 117 via actuator 119 and/or until writing system 100 receives an input from a user.

For example, referring back to FIG. 1, a user of writing system 100 may actuate operative control 129 to initiate transmission of the image data recorded by writing instrument 110 to computing device 130. In one example, in response to actuating operative control 129, reusable notebook 120 may transmit a wireless signal via the communications module of reusable notebook 120 to a corresponding communications module of writing instrument 110. The wireless signal may include one or more instructional commands directing writing instrument 110 to deliver the image data to computing device 130 for processing.

Depending on a configuration of operative control 129, the wireless signal transmitted from reusable notebook 120 to writing instrument 110 may vary with respect to the instructions on which portion of the image data to transmit to computing device 130. For example, in embodiments where each sheet 122 includes one operative control 129, reusable notebook 120 may be configured to transmit instructions for delivering all the image data corresponding to a particular sheet 122 upon actuation of operative control 129. In embodiments where each sheet 122 includes one operative control 129 for each line on sheet 122, reusable notebook 120 may be configured to transmit instructions for delivering only the image data corresponding to a portion of sheet 122 along the particular line. In embodiments, reusable notebook 120 may include a single operative control 129 for the plurality of sheets 122 such that actuation of operative control 129 may initiate delivery of all the image data for the plurality of sheets 122.

In examples, reusable notebook 120 may be configured such that actuation of operative control 129 initiates a live stream recording by imaging device 117 such that the written markings produced by writing instrument 110 onto sheet 122 are automatically transmitted to computing device 130 as image data. In this instance, operative control 129 is actuated prior to producing written content on reusable notebook 120 such that computing device 130 receives the image data in real-time as writing instrument 110 produces the written markings on sheets 122. The live communication feed between writing instrument 110 and computing device 130 may be terminated upon subsequent actuation of operative control 129. It is contemplated that aspects of the present disclosure may be used in an education setting, where, e.g., an instructor, may readily display (e.g., via display 132) to students the markings made on sheets 122 in real time.

At step 204, the signal indicative of the transmission command may be received at a communications module of writing instrument 110. In embodiments, writing instrument 110 may be configured to cease operation of imaging device 117 in response to receiving the transmission command from reusable notebook 120. In embodiments, imaging device 117 may continue to capture images of reusable notebook 120 as writing instrument 110 processes the signal and delivers the image data to computing device 130. In this instance, the computing device 130 may receive and store raw image data 142 captured by imaging device 117 onto memory 138.

At step 206, processor 136 may execute conversion logic 140 to convert the segment code stored in raw image data 142 or printed code or coded data to the corresponding positional information printed in each cell 128. Further, at step 208, processor 136 may be configured to associate a relative position of the markings written on working surface 126 by writing instrument 110 with a location of the particular cell 128 that the marking was written adjacent to and/or on. Processor 136 may generate converted written data 144 from the positional information and markings derived from raw image data 142. Converted written data 144 may be stored in memory 138 and include a plurality of written markings defined by a spatial relationship relative to one another.

At step 210, processor 136 of the computing device 130 may be configured to generate one or more digitized representations of converted written data 144. For example, processor 136 may produce a graphical representation of converted written data 144 such that the plurality of written markings are superimposed on a backdrop corresponding to sheet 122. This means that the graphical representation may simulate the markings produced by writing instrument 110 on the reusable notebook 120 in accordance with a movement of tip 118 on sheet 122.

In embodiments, processor 136 may produce a textual representation of converted written data 144 such that the plurality of written markings are analyzed and converted into a character format. In this instance, the textual representation may transform the markings produced by writing instrument 110 on reusable notebook 120 to printed text that may be text-searchable. It should be appreciated that converted written data 144 may be digitized by computing device 130 into various other suitable format representations than those shown and described herein without departing from a scope of this disclosure.

Computing device 130 may display the representations of converted written data 144 onto display 132 and allow a user of the writing system 100 to edit the representations via user interface 134. Computing device 130 may further be operable to transmit the representations to one or more other devices e.g., a computer, a printer, a mobile device, etc., allow for user modification of converted written data 144, and the like. In embodiments, processor 136 may be configured to conduct one or more analysis of converted written data 144, such as, for example, an orthography review. It should be appreciated that computing device 130 may be operable to perform the one or more analysis with converted written data 144 formatted in either the graphical or textual representation. Additionally, memory 138 may be operable to store a plurality of representations for each of the plurality of sheets 122 in one or both of the digitized representation formats described herein.

In embodiments, computing device 130 may further be configured to generate an audio representation of the written markings in the form of an audio file. In this instance, the converted written data 144 may include an audible transcription of the content written on reusable notebook 120 by writing instrument 110. Computing device 130 may be operable to play the audio file and/or transmit the audible representation to one or more other devices e.g., a mobile phone, a portable media player, a portable flash drive, a computer, etc. Additionally and/or alternatively, writing instrument 110 may include a microphone on body 112 such that audible recordings captured by the microphone may be transmitted to computing device 130 e.g., in conjunction with and/or in lieu of raw image data 142 upon actuation of operative control 129.

At step 212, the written markings on working surface 126 may be removed by a user of writing system 100. In examples, the material e.g., ink forming the written markings may be removed by applying heat to sheet 122. In this instance, the material dispensed from working instrument 110 may be configured to dissipate in response to an exposure of a predetermined temperature. In embodiments, the material may be removed by engaging an ancillary device against sheet 122. In this instance, the material dispensed from the writing instrument 110 may be configured to dissolve, dissipate, and be otherwise removed in response to the ancillary device. In examples, the material may include a thermochromic ink and the ancillary device may include a dry apparatus e.g., a fabric, a textile, a cloth, a polymer, etc. for wiping the ink off of working surface 126.

It should be appreciated that thermochromic ink may be erasable in response to encountering heat. In embodiments, the heat may be applied by placing sheets 122 and/or reusable notebook 120 into a microwave. In examples of materials suitable for making markings on reusable notebook 120 may include, but is not limited to, non-permanent dry erase ink e.g., silicone polymer, ink comprising solid particles e.g., particles having a size greater than a porosity of sheets 122, dye-based inks, and more. More specifically materials suitable for making markings on reusable notebook 120 may include non-permanent dry erase ink e.g., silicone polymer, ink comprising solid particles e.g., particles having a size greater than a porosity of sheets 122.

Accordingly, sheet 122 may be reutilized by a user of writing system 100 for producing further written materials on working surface 126 without generating waste from a disposal of sheet 122. Further, the written material removed from reusable notebook 120 is stored and accessible to a user of writing system 100 via computing device 130 despite an erasure of the written markings from sheet 122.

All technical and scientific terms used herein have the same meaning as commonly understood to one of ordinary skill in the art to which this disclosure belongs unless clearly indicated otherwise. As used herein, the singular forms "a", "an", and "the" include plural references unless the context clearly dictates otherwise.

The above description is illustrative and is not intended to be restrictive. One of ordinary skill in the art may make numerous modifications and/or changes without departing from the general scope of the disclosure. For example, and as has been described, the above-described embodiments (and/or aspects thereof) may be used in combination with each other. Additionally, portions of the above-described embodiments may be removed without departing from the scope of the disclosure. In addition, modifications may be made to adapt a particular situation or material to the teachings of the various embodiments without departing from their scope. Many other embodiments will also be apparent to those of skill in the art upon reviewing the above description.

As is evident from the figures and text presented above, as well as the examples below, a variety of embodiments are contemplated:

1. A writing system, comprising: a reusable notebook including a sheet having a working surface, wherein the working surface includes a printed code including an operative control; and a writing instrument configured to capture images of the printed code.

2. The writing system of embodiment 1, wherein the operative control may be selectively actuated to transfer the images captured by the writing instrument to a computing device or cloud storage.

3. The writing system of embodiment 2, wherein the computing device determines positional information of written markings made by the writing instrument on the working surface by decoding the printed code from the images.

4. The writing system of embodiment 3, wherein the computing device digitizes the written markings into a graphical format representation or a textual format representation.

5. The writing system of any one of embodiments 1-4, wherein written markings made by the writing instrument on the working surface are selectively removable.

6. The writing system of any one of embodiments 1-5, wherein the operative control is positioned on the working surface.

What is claimed is:

1. A writing system, comprising:
   a reusable notebook including a sheet having a working surface, wherein the working surface includes a printed code including an operative control;
   a writing instrument provided with an imaging device configured to capture one or more images during use of the writing instrument on the working surface of the reusable notebook; and
   a computing device configured to communicate with the reusable notebook and the writing instrument,
   wherein the sheet includes a surface coating over the working surface configured so that a writing material of the writing instrument can be removed by applying heat to the sheet, the surface coating having a glossy finish.

2. The writing system of claim 1, wherein the surface coating is non-porous or wherein the sheet is non-porous.

3. The writing system of claim 1, wherein the operative control is selectively actuated by a user of the writing system to transfer the images captured by the writing instrument to the computing device or a cloud storage.

4. The writing system of claim 1, wherein the computing device is configured to determine positional information of written markings made by the writing instrument on the working surface by decoding the printed code from the images.

5. The writing system of claim 1, wherein the computing device is configured to digitize written markings made by the writing instrument on the working surface into a graphical format representation and/or a textual format representation.

6. The writing system of claim 1, wherein the operative control is arranged on the working surface.

7. The writing system of claim 1, wherein the computing device is configured to generate an audio representation of written markings in the form of an audio file.

8. A method of generating reusable content with a writing system according to claim 1, the method comprising the steps of:
   initiating the imaging device to capture one or more images during use of the writing instrument on the working surface of the reusable notebook,
   converting the one or more images into one or more electronic formats with the computing device, and
   removing written markings from the reusable notebook by applying heat to the sheet.

9. The method of claim 8, wherein capture one or more images during use of the writing instrument is done with a writing instrument distal end positioned adjacent to the sheet such that a field of view of the imaging device projects toward the working surface.

10. The method of claim 8, wherein the one or more images captured by the imaging device include coded data printed within cells of the working surface.

11. The method of claim 9, wherein converting the one or more images into one or more electronic formats with the computing device comprises converting the printed code printed within cells of the working surface into positional information.

12. The method of claim 11, further comprising associating the positional information to corresponding markings written on the working surface in images.

13. The method of claim 8, further comprising generating one or more digitized representations of converted written data into graphical or textual representation.

14. The method of claim 8, wherein using the writing instrument on the working surface of the reusable notebook comprises moving a tip of the writing instrument on the sheet.

15. A method of generating reusable content with a writing system, the writing system including a reusable notebook including a sheet having a working surface, wherein the working surface includes a printed code including an operative control; a writing instrument provided with an imaging device configured to capture one or more images during use writing instrument on the working surface of the reusable notebook; and a computing device configured to communicate with the reusable notebook and the writing instrument, wherein the sheet includes a surface coating over the working surface configured so that a writing material of the writing instrument can be removed by applying heat to the sheet, the surface coating having a glossy finish, the method comprising the steps of:
  initiating the imaging device of the writing instrument to capture one or more images during use of the writing instrument on the working surface of the reusable notebook;
  converting the one or more images into one or more electronic formats with the computing device; and
  generating one or more digitized representations of converted written data into graphical or textual representation.

16. A method of generating reusable content with a writing system, the writing system including a reusable notebook including a sheet having a working surface, wherein the working surface includes a printed code including an operative control; a writing instrument provided with an imaging device configured to capture one or more images during use writing instrument on the working surface of the reusable notebook; and a computing device configured to communicate with the reusable notebook and/or the writing instrument, wherein the sheet includes a surface coating over the working surface configured so that a writing material of the writing instrument can be removed by applying heat to the sheet, the surface coating having a glossy finish, the method comprising the steps of:
  initiating the imaging device of the writing instrument to capture one or more images during use of the writing instrument on the working surface of the reusable notebook;
  converting the one or more images into one or more electronic formats with the computing device; and
  removing written markings from the reusable notebook, wherein the sheet includes a surface coating over the working surface, and wherein the removing comprises applying heat to the sheet.

* * * * *